(12) United States Patent
Li et al.

(10) Patent No.: US 10,572,378 B2
(45) Date of Patent: Feb. 25, 2020

(54) DYNAMIC MEMORY EXPANSION BY DATA COMPRESSION

(71) Applicant: Hewlett Packard Enterprise Development LP, Houston, TX (US)

(72) Inventors: Sheng Li, Palo Alto, CA (US); Jichuan Chang, Sunnyvale, CA (US); Jishen Zhao, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 130 days.

(21) Appl. No.: 15/115,307

(22) PCT Filed: Mar. 20, 2014

(86) PCT No.: PCT/US2014/031332
§ 371 (c)(1),
(2) Date: Jul. 29, 2016

(87) PCT Pub. No.: WO2015/142341
PCT Pub. Date: Sep. 24, 2015

(65) Prior Publication Data
US 2017/0004069 A1 Jan. 5, 2017

(51) Int. Cl.
*G06F 12/02* (2006.01)
*G06F 12/08* (2016.01)
*G06F 3/06* (2006.01)
*G06F 12/0875* (2016.01)
*G06F 12/0893* (2016.01)

(52) U.S. Cl.
CPC ............ *G06F 12/023* (2013.01); *G06F 12/08* (2013.01); *G06F 12/0875* (2013.01); *G06F 12/0893* (2013.01); *G06F 3/0638* (2013.01); *G06F 2212/1044* (2013.01); *G06F 2212/401* (2013.01); *G06F 2212/466* (2013.01); *G06F 2212/608* (2013.01)

(58) Field of Classification Search
None
See application file for complete search history.

(56) References Cited

U.S. PATENT DOCUMENTS

| | | |
|---|---|---|
| 6,968,424 B1 | 11/2005 | Danilak |
| 7,162,583 B2 | 1/2007 | Adl-Tabatabai |
| 7,944,375 B2 | 5/2011 | Abali |

(Continued)

OTHER PUBLICATIONS

Linearly compressed pages: a low-complexity, low-latency main memory compression frameworkG Pekhimenko, V Seshadri, Y Kim, H Xin. . .-Proceedings of the 46th, 2013 (Year: 2013).*

(Continued)

*Primary Examiner* — Jared I Rutz
*Assistant Examiner* — Marwan Ayash
(74) *Attorney, Agent, or Firm* — Mannava & Kang, P.C.

(57) ABSTRACT

Dynamic memory expansion based on data compression is described. Data represented in at least one page to be written to a main memory of a computing device is received. The data is compressed in the at least one page to generate at least one compressed physical page and a metadata entry corresponding to each page of the at least one compressed physical page. The metadata entry is cached in a metadata cache including metadata entries and pointers to the uncompressed region of the at least one compressed physical page.

20 Claims, 8 Drawing Sheets

(56) References Cited

U.S. PATENT DOCUMENTS

| | | | |
|---|---|---|---|
| 8,135,903 B1* | 3/2012 | Kan | G06F 12/0246 711/103 |
| 9,355,121 B1* | 5/2016 | Scheer | G06F 17/30221 |
| 2003/0217237 A1* | 11/2003 | Benveniste | G06F 12/08 711/153 |
| 2005/0144387 A1* | 6/2005 | Adl-Tabatabai | G06F 12/0862 711/118 |
| 2005/0268046 A1 | 12/2005 | Heil | |
| 2006/0047916 A1 | 3/2006 | Ying et al. | |
| 2007/0157001 A1 | 7/2007 | Ritzau | |
| 2009/0228635 A1 | 9/2009 | Borkenhagen | |
| 2011/0022819 A1 | 1/2011 | Post et al. | |
| 2012/0212498 A1 | 8/2012 | Dye | |
| 2014/0282589 A1* | 9/2014 | Kuang | G06F 9/5016 718/104 |

OTHER PUBLICATIONS

Chen, X. et al., C-pack: a High-performanceMicroprocessor Cache Compression Algorithm, (Research Paper), Aug. 30, 2013, 11 Pgs.

Dusser, J. et al., Decoupled Zero-compressed Memory, (Research Paper), Sep. 24 2010, 10 Pgs.

PCT Search Report/Written Opinion ~ Application No. PCT/US2014/031332 dated Dec. 8, 2014 ~ 10 pages.

Tremaine et al., "IBM memory expansion technology (MXT)," IBM Journal of Research and Development, Mar. 2001, vol. 45, No. 2, pp. 271-285, 2001.

Pekhimenko et al., "Linearly compressed pages: a main memory compression framework with low complexity and low latency," in CMU Technical Report, 2012, 1 page.

Pekhimenko et al., "Base-delta-immediate compression: practical data compression for on-chip caches," in PACT, 2012, pp. 377-388.

Ferdman et al., "Clearing the clouds: a study of emerging scale-out workloads on modern hardware," In Proceedings of the 17th Conference on Architectural Support for Programming Languages and Operating Systems (ASPLOS 2012), 2012, pp. 37-48.

Ekman et al., "A Robust Main-Memory Compression Scheme," in ISCA, 2005, pp. 74-85.

"Active memory expansion: overview and usage guide," https://www.ibm.com/systems/power/hardware/whitepapers/am_exp.html.

* cited by examiner

DYNAMIC MEMORY EXPANSION BY DATA COMPRESSION

BACKGROUND

In recent years, enterprises have seen substantial growth in data volume. Since the enterprises continuously collect large datasets that record information, such as customer interactions, product saes, and results from advertising campaigns on the Internet, many enterprises today are facing tremendous challenges due to the dramatic growth in data volume. Consequently, storage and analysis of large volumes of data have emerged as a challenge for many enterprises, both big and small, across all industries. For instance, while processing such large volumes of data, it has become challenging for the enterprises to meet memory capacity requirements in computing devices used for such processing.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
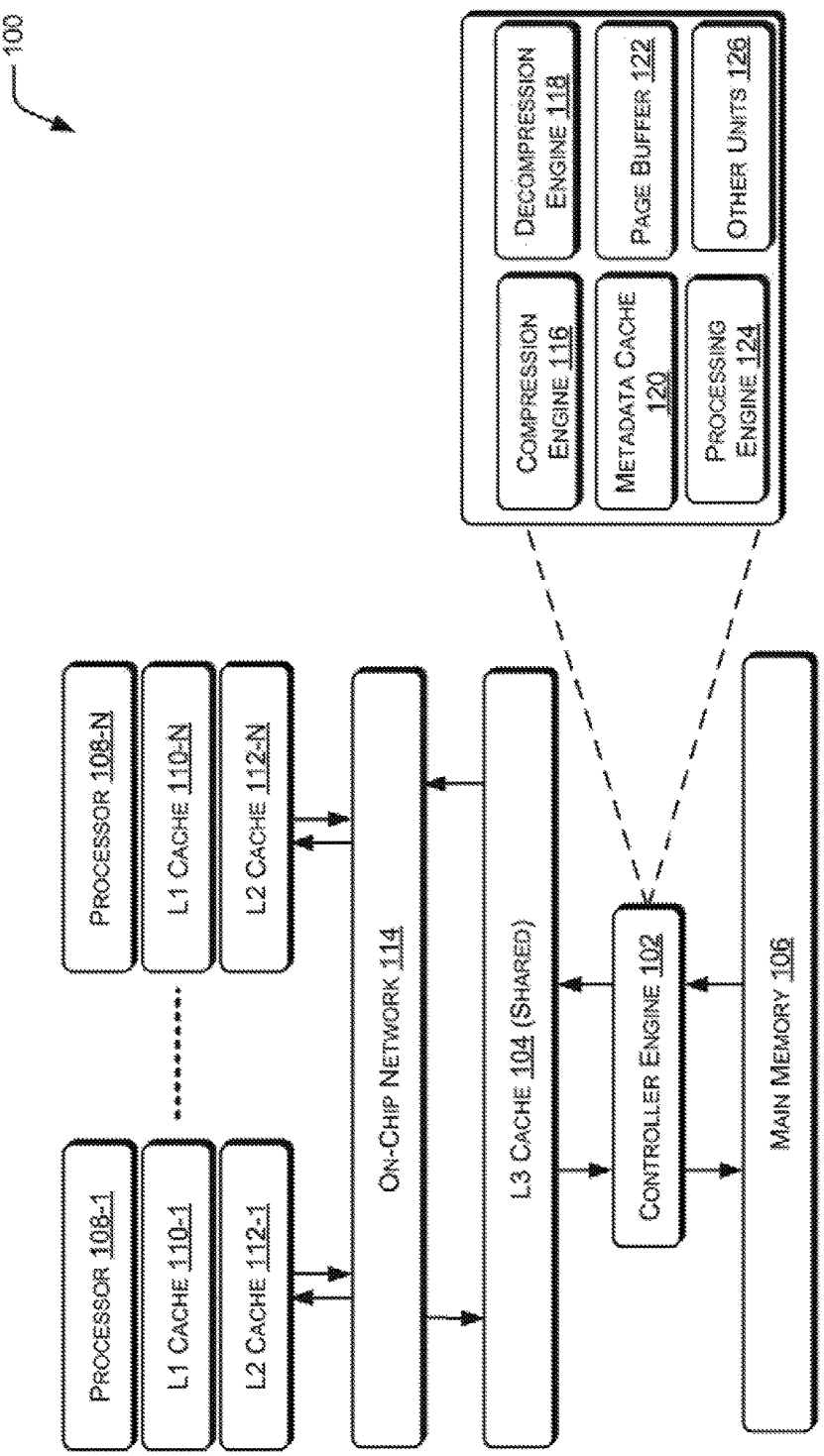
FIG. 1 illustrates an example computing device implementing a controller engine.

The present subject matter relates to systems and methods for dynamic memory expansion based on transparent data compression for computing devices processing large amounts of data. The described systems and methods may be implemented in various computing devices connected through various networks. Although the description herein is with reference to data centers and the computing devices thereon, the methods and described techniques may be implemented in other devices, albeit with a few variations.

Main memory is an expensive resource in a computing device. Processing large volumes of data with large memory wording sets, such as data utilized by High Performance Analytic Appliances (e.g., the HANA platform provided by SAP AG, of Walldorf, Germany), generally demands large main memory capacity with significant performance. However, directly increasing the capacity of the main memory of the computing device by adding additional memory is limited by availability of memory slots per processor.

Once the available memory slots per processor are utilized, increased memory capacity is usually accomplished by adding more processing units. Addition of more processing units provides a nominal performance gain in data centric big data workloads but significantly increases the total cost of ownership (TCO) of the computing devices. Such significant increase in TCO, merely for the purpose of increased memory capacity, is rarely justifiable. Hence, reducing demand of physical memory while still meeting the memory capacity demand in processing large volumes of data, such as big data workloads, may reduce the TCO of the computing devices.

Memory compression may increase the effective memory capacity without physically increasing the memory capacity. Therefore, memory compression techniques may provide larger memory capacity without the addition of more processing units. Further, TCO is also not much elevated which provides an added incentive for the usage of memory compression techniques. However, utilization and implementation of memory compression techniques include a great amount of challenges.

Generally, data represented as pages is stored in the form of pages in the main memory and may be noted as a fixed-length block of memory that is the smallest unit of data for memory allocation and transfer between storage and other memories. For the sake of explanation, pages physically stored on the main memory are referred to as physical pages and, pages stored in a virtual memory are referred to as virtual pages. In memory compression techniques, generally the physical pages are compressed. Such compression of the physical pages in a main memory generally causes generation of physical pages of irregular sizes. This poses memory management challenges, such as address translation since virtual pages are generally fixed-sized while the physical pages may be compressed to variable sizes. Therefore, either an operating system (OS) or a specific hardware structure is engaged to map the physical pages between virtual and physical addresses.

Further, in examples where physically tagged processor caches are implemented, the utilization of memory compression techniques is even more challenging, in such examples, on-chip caches, such as L1 cache and L2 cache generally employ tags derived from the physical address of a cache line of a physical page to avoid aliasing; and every cache access necessitates the use of the physical address of the corresponding cache line to be computed. Since the main memory addresses of the compressed cache lines differ from the nominal physical addresses of those lines, computation of cache line tags may lengthen a critical path of latency, such as critical L1 cache accesses making it unsuitable for time sensitive operations.

Furthermore, utilization of memory compression techniques poses a challenge of ensuring proper allocation and de-allocation of memory space without over-committing the capacity of the compressed main memory. In examples of occurrence of over-committing the capacity of the compressed main memory, the OS may crash, thereby halting the processing of data.

Therefore, the utilization of memory compression techniques to provide an expanded memory poses grave challenges. Along with challenges faced in utilization of memory compression techniques, the implementation of such techniques is also challenging, implementation of memory compression techniques may either be based on transparent mechanisms in which computing device OS is unaware of implementation of such techniques, or may be based on OS aware mechanisms where the memory compression techniques are known to the OS. White implementations where OS aware mechanisms necessitates architectural changes in the OS which are cumbersome and time consuming, implementation of transparent mechanisms either suffer with an overhead latency and incapability to cache large working sets making them unsuitable for processing of large data; or may have to utilize multiple cores which increases the TCO.

According to an example implementation of the present subject matter, systems and methods for dynamic memory expansion based on data compression are described. The described systems and methods may allow processing of large amounts of data using dynamic memory compression techniques such that no changes are made in the OS, and effective memory capacity is increased with minimal performance overhead.

The described systems and methods may be implemented in various computing devices connected through various networks. The computing devices may be, for example, servers, data centers, desktop computers, laptops, smart phones, personal digital assistants (PDAs), tablets, and such. Various example implementations of the present subject matter have been described below by referring to several examples.

In an example of the present subject matter, the described systems may either be implemented along with a memory controller or a memory-side controller. Further, described systems and methods may receive data from different sources onto a main memory and may also provide data to such sources from the main memory.

According to an example implementation of the present subject matter, a controller engine (CE) to communicate data between a last level cache (LLC) and a main memory of a computing device is described. The CE may transparently compress data stored in the main memory such that the OS of the computing device is unaware of such compression. Further, the CE may provide an increased memory space to the OS for its utilization, and deliver larger memory capacity. Therefore, the CE may provide dynamic memory expansion to computing devices, such as data centers that process large volumes of data.

It may be noted that the virtual address space is a set of virtual addresses that the OS of the computing device generates and makes available to a process or an application. Such virtual address space is generally mapped to a physical address space that includes a set of physical addresses of storage cells of the main memory. The mapping of the virtual address space with the physical address space allows the OS to allocate contiguous virtual addresses to the process while the actual data may be stored in non-contiguous and scattered physical addresses.

According to an example implementation of the present subject matter, the CE may implement a false address space between the virtual address space and the actual physical address space of the main memory to transparently store compressed data in the physical pages. Since compressed data could result in pages of irregular sizes, in said example implementation the CE may provide the false address space to the OS instead of the physical address space of the main memory for the purpose of mapping the virtual addresses to the physical addresses. Further, the CE may also map the false address space to the physical address space of the main memory where the compressed data is stored as physical pages.

For the purpose of explanation, in the following description, contiguous addresses provided by the OS to processes and applications have been referred to as virtual addresses. Further, false addresses provided to the OS as physical addresses are referred to as shadow addresses hereinafter. Furthermore, addresses of the main memory where actual compressed data is stored as physical pages have been referred to as physical addresses hereinafter. It should be noted that a set of virtual addresses has been referred to as a virtual address space hereinafter while a set of shadow addresses is referred to as a shadow address space hereinafter. Similarly, a set of physical addresses is referred to as a physical address space, hereinafter. It should also be noted that the CE may provide the shadow address space to the OS to map to the virtual address space.

In operation, the CE may receive data from different sources, such as an application of the computing device, to be stored in the main memory. The CE may compress such data prior to storage in the main memory. The data received by the CE may be represented in forms of pages where each page may include multiple cache lines. The data therefore, in the form of pages may either represent 'zero pages' initialized by the OS of the computing device, or may represent 'mapped pages' from secondary storage devices.

In one example implementation, the CE may compress each page of the data based on a two-level compression mechanism to generate compressed physical pages. The two-level compression mechanism is further explained in detail with reference to the description of figures in the forthcoming description. The CE may further generate a metadata entry of a predefined size, corresponding to the compressed physical page, and the metadata entry may include information for one or more metadata parameters. The information for the one or more metadata parameters may indicate the physical address of storage of the compressed physical page and details of compression associated with the compressed physical page along with details of compression of each cache line within the page.

In another example implementation of the present subject matter, the CE may segregate the main memory into a data section and a metadata section. The compressed physical pages may be stored in the data section and the metadata entries corresponding to the compressed physical pages may be stored in the metadata section. Further, the compressed physical pages may be of different sizes while the metadata entries which include information related to the compressed physical pages may be of a predefined size and be stored in the metadata section of the main memory.

Since the metadata section directly provides information of the compressed physical pages, the metadata section may be directly mapped to the shadow address space by the CE, while being stored in the main memory and referenced by the physical address space. In other words, each shadow address in the shadow address space may be identified by a metadata entry in the metadata section and, therefore, the total number of entries in the metadata section may be determined by the total capacity of the shadow address space.

In one example implementation of the present subject matter, applications running on the OS may access data based on the virtual address memory implemented by the OS. Since the virtual address space is mapped to the shadow address space, the OS may request fetching of the data based on the shadow address space. The CE may then determine the physical address corresponding to the shadow address based on the associated metadata entry and may retrieve the data. In said example implementation, to instantly access the physical address corresponding to the shadow address, the CE may cache one or more metadata entries in a metadata cache. Based on the cached metadata entries, the CE may instantly determine information about the compressed physical pages and the latency in memory access may be substantially reduced.

Therefore, based on the example implementation of the described systems, such as the controller engine, a dynamic memory expansion may be provided to the computing devices. The described systems and methods may implement compression techniques such that the compressed data is made transparent to the OS of the computing device and processing of large volumes of data may be achieved. Moreover, while processing data with large memory working sets, the described systems and methods may improve the overall performance and significantly reduce the TCO of the computing devices.

The example systems and methods are further described with reference to FIG. 1 to FIG. 8. It should be noted that the description and figures merely illustrate the principles of the present subject matter along with examples. It is thus noted that various arrangements may be devised that, although not explicitly described or shown herein, embody the principles of the present subject matter. Moreover, all statements herein reciting principles, aspects, and examples of the present subject matter as well as specific examples thereof, are intended to encompass equivalents thereof.

FIG. 1 illustrates a computing device 100 implementing a controller engine (CE) 102, in accordance with an example of the present subject matter. According to an example implementation of the present subject matter, the computing device 100 may be implemented as, but is not limited to, a server, a workstation, a computer, a data center, an embedded system, and the like. The CE 102 may enable communication between a last level cache of the computing device, such as L3 cache 104, and a main memory of the computing device 100, such as main memory 106. Although the computing device 100 has been depicted to include multiple caches and processors, it may be noted that the CE 102 may be implemented in different architectures of the computing device 100.

The CE 102 may be implemented on a single integrated circuit along with other components of the computing device 100. In one example implementation, the CE 102 may either be implemented as an independent hardware unit, or may be integrated with on chip memory units, such as memory controllers and memory-side controllers. The CE 102 may be attached to an interconnect, such as, for example, the Intel Quickpath interconnect (QPI), to support direct memory accesses. Also, the CE 102 may be attached to a peripheral component interconnect express (PCIe) interface to support remote memory accesses. The CE 102 may also be a machine readable instructions-based implementation, a hardware-based implementation, or a combination thereof.

In another example implementation, the computing device 100 may also include one or more processors 108-1, . . . , 108-N. For the purpose of explanation, the processors 108-1, . . . , 108-N may be collectively referred to as processors 108, and individually referred to as a processor 108.

The processor(s) 108 may be implemented as microprocessors, microcomputers, microcontrollers, digital signal processors, central processing units, state machines, logic circuitries, accelerators, and/or any devices that manipulate signals based on operational instructions. Among other capabilities, the processors) 108 may fetch and execute computer-readable instructions stored in a memory. The functions of the various elements shown in the figure, including any functional blocks labeled as "processors)", may be provided through the use of dedicated hardware as well as hardware capable of executing machine readable instructions.

The processors 108 may be communicatively coupled to various on-chip dedicated and shared cache memories, such as an L1 cache, an L2 cache, an L3 cache, and so on. As generally used herein, the term "communicatively coupled" may mean a connection between devices to exchange data signals with each other, such as an electrical signal, electromagnetic signal, optical signal and the like. For the purpose of explanation, L1 caches 110-1, . . . , 110-N, and L2 caches 112-1, . . . 112-N, have been described to be dedicated cache memories to processors 108-1, . . . , 108-N, respectively. The L1 caches 110-1, . . . , 110-N may be commonly referred to as L1 caches 110 and may be individually referred to as L1 cache 110, hereinafter. Similarly, L2 caches 112-1, . . . , 112-N may be commonly referred to as L2 caches 112 and may be individually referred to as L2 cache 112, hereinafter. It may be noted that although the cache that is physically closest to the processors 108 is shown to be the L1 cache 110 and then the relatively farther L2 cache 112 is shown, the designation of caches may be reversed in some example implementation of the present subject matter.

The dedicated cache memories such as the L1 cache 110 and L2 cache 112 may be communicatively coupled to shared cache memories of the computing device 100, such as the L3 cache 104. An on-chip network 114 may be available with the dedicated and shared caches to communicate with each other and different on-chip components. The cache memories, such as L1 cache 110, L2 cache 112, and L3 cache 104 may be implemented as volatile memories, such as a Dynamic random-access memory (DRAM), an Embedded DRAM (eDRAM), a Static random-access memory (SRAM), a Thyristor RAM (T-RAM), a Zero-capacitor RAM (Z-RAM), and a Twin Transistor RAM (TT-RAM).

The on-chip network 114 may utilize any known on-chip communication architecture, such as, for example, an Advanced Microcontroller Bus Architecture, implementing any of the Advanced extensible Interface (AXI), Advanced High-performance Bus (AHB), and Advanced Peripheral Bus (APB) protocols. The on-chip network 114 may also utilize any of the other known architectures such as, but not limited to, accelerated graphics port (AGP), (extended) industry standard architecture (EISA), micro channel architecture (MCA), NuBus, peripheral component interconnect (PCI), peripheral component interconnect (extended) (PCI-X), personal computer memory card international association (PCMCIA), and the like.

The main memory 106 may also be communicatively coupled to the cache memories and the CE 102 through the on-chip network 114. The main memory may also be implemented as a volatile memory, including, but not limited to, SRAM, DRAM, phase-change RAM (PRAM), and the like.

The FIG. 1 also illustrates the components of the CE 102, in an exploded view. The CE 102, in one example implementation of the present subject matter may include a compression engine 116, a decompression engine 118, a metadata cache 120, a page buffer 122, a processing engine 124, and other units 126. The components of the CE 102, amongst other things, may include hardware structures, routines, programs, objects, components, data structures, and the like, which perform particular tasks. The CE 102 may also include the other units 126 that may include components that supplement functioning of the CE 102.

The following description describes the working of the CE 102 in the computing device 100 along with the cache memories and the main memory 106 to process large volumes of data, in accordance with the present subject matter.

It will be noted that the concepts thereto may be extended to other applications of the computing device 100 as well.

In one example implementation, the CE 102 may process data to be stored onto the main memory 106. The CE 102 may also provide the data to various entities, such as cache memories and applications running on the OS, on request to access such data. It should be noted that the data to be stored on the main memory 106 is represented in the form of pages and stored as physical pages where each physical page includes one or more cache lines.

In operation, the CE 102 may compress data prior to sharing it onto the main memory 106. Since the data is compressed and stored onto the main memory 106, the CE 102 may also provide a shadow address space to the operating system of the computing device 100 instead of the physical address space. The compression of data, its storage, and referencing of the stored data based on the shadow and physical address space is defined hereinafter.

The compression engine 116 of the CE 102 may compress received data for storage onto the main memory 136. In one example implementation of the present subject matter, the compression engine 116 may utilize a pre-defined two-level compression mechanism to compress each page and each cache line within the page and generate a compressed physical page.

The compression engine 116 may utilize a linearly compressed page (LCP) framework as a basic framework to generate the compressed physical pages. That is, the compression engine 116 may compress each page such that each compressed physical page may include a compressed region and an uncompressed region.

Figure 2:
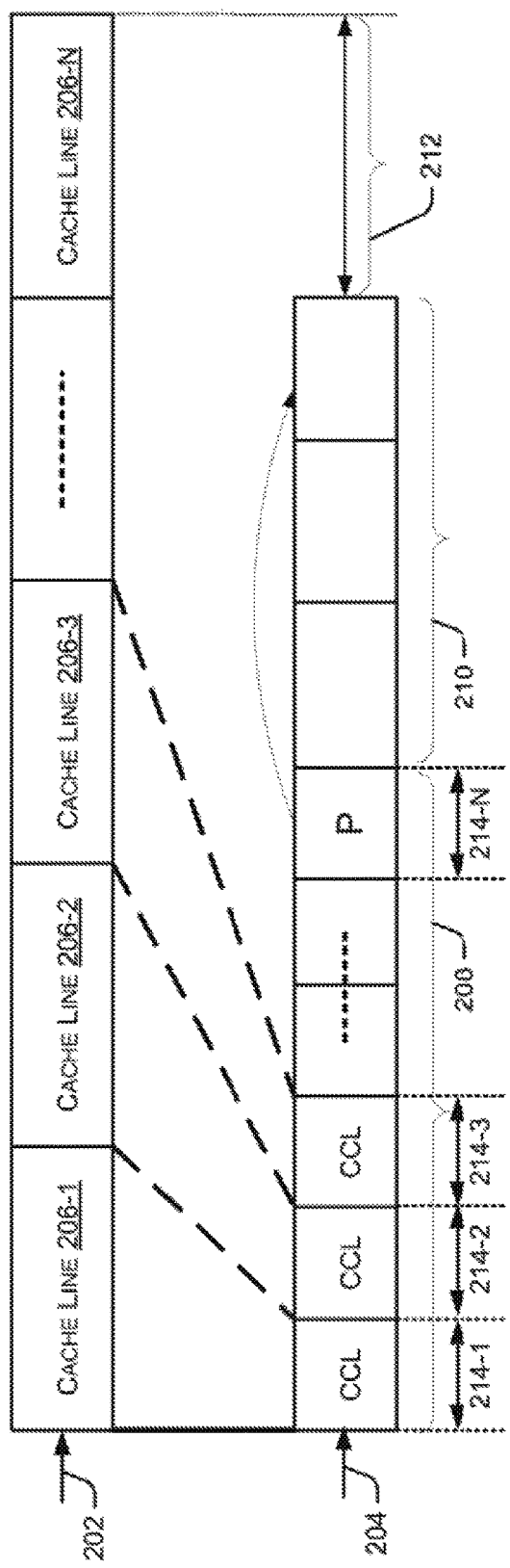
FIG. 2 illustrates an example compressed physical page.

FIG. 2 depicts a page 202 to be stored onto the main memory 106. The FIG. 2 also depicts a compressed physical page 204 generated by the compression engine 116. The page 202 may include multiple cache lines 206-1, 206-2, 206-3, . . . , 206-N. For the sake of explanation, the cache lines 206-1, 206-2. 206-3, . . . , 206-N may be commonly referred to as cache lines 206 and individually referred to as cache line 206. The compressed region of the compressed physical page 204 is depicted by region 208 and the uncompressed region of the compressed physical page is depicted by region 210. Further, the reduction in size in the original page 202 after compression is depicted as the region 212. It may be noted that a compression ratio achieved for different cache lines 206 may be different, and correspondingly the region 212 may also vary accordingly.

Each cache line 206 may include data bytes that represent information stored on the page 202. It may be noted that some of the cache lines 206 may have all zero data bytes. Such cache lines 206 may be referred to as zero cache lines.

In one example implementation of the present subject matter, the compression engine 116 may compress each cache line 206 of the page 202 into a slot of a predefined size. The compressed physical page 204 depicts the slots of predefined size, such as 214-1, 214-2, . . . , 214-N, where each cache line 206 is compressed and stored as a compressed cache line (CCL). For example, the cache line 206-1 having 64 bytes of value may be compressed by the compression engine 116 and stored in the slot 214-1 of size 16 bytes. Similarly, the cache line 206-2 having 58 bytes may also be compressed by the compression engine 116 and stored in the slot 214-2 of size 16 bytes.

A cache line 206 that may be compressed to a smaller size may still be included in the slot of predefined size to occupy the entire slot, thereby leaving the rest of the space of the slot empty. For example, in case the cache line 206-3 includes 32 bytes and the compression engine 116 may compress the cache line 206-3 into 12 bytes, the compression engine 116 may still store the compressed cache line in the slot 214-3 of 16 bytes, leaving the remaining 4 bytes empty.

In examples where a cache line 206 is found to be uncompressible to an extent that it may not be stored into the slot of predefined size, the compression engine 116 may leave such cache line 206 uncompressed. That is, if the cache line 206 is uncompressible or necessitates a larger space than the size of the slot after compression, the compression engine 116 may not compress such cache line 206 and mark it as an uncompressible cache line 206.

In such examples where the compression engine 116 identifies a cache line 206 to be an uncompressible cache line 206, the compression engine 116 may store the uncompressible cache line 206 into the uncompressed region 210 of the compressed physical page and, may store a pointer for its place in the compressed region 208 to index its position in the uncompressed region 212. For example, if the cache line 206-N is identified to be an uncompressible cache line 206-N by the compression engine 116, the cache line 206-N may be stored in the uncompressed region 210 of the compressed physical page while a pointer 'P' may be stored at the slot 214-N in the compressed region 208 to index the position of storage of the cache line 206-N in the uncompressed region 210.

Therefore, it may be noted that an upper bound of compression ratio of the main memory 106 will be the size of an uncompressed cache line 206 versus the predefined slot size to store the compressed cache line.

In one example implementation of the present subject matter, the CE 102 may setup a compressed physical page 204 in the main memory 106 when it is firstly touched in either of the following two ways. First, the physical page may be initialized by an operating system of the computing device 100. Second, the physical page may be a mmapped page from a secondary storage device, such as a hard disk. In either case, the page buffer 122 of the CE 102 may buffer the page 202 and compress as many cache lines 206 as possible to achieve a highest possible compression ratio.

As described earlier, the two-level compression mechanism adopted by the compression engine 116 to compress the page 202 may include compression of cache lines 206 based on identification of zero cache lines. In a first level of the two-level compression mechanism, zero cache lines in a page may be identified. In the second level, compression of zero and non-zero segments within a non-zero cache line is achieved.

In the first level of compression, the identified zero cache lines are not considered for storage in the compressed physical page 204. However, the details of the zero cache lines are stored in a metadata section of the main memory 106. The details of the metadata section and information stored in the metadata section of the main memory 106 are discussed in detail in the forthcoming description of methods of storage of compressed physical pages.

The compression engine 116 may terminate the compression of the cache line 206 if it is identified to be a zero cache line. However, if it is identified that the cache line 206 is a non-zero cache line, the compression engine 116 may proceed to the second level of the two-level compression mechanism. In the second level of the compression, the compression engine 116 may divide the cache line 206 into smaller segments where each segment is attempted to be compressed to one fourth of its original size. For example, if a 64 byte cache line 206 is divided into segments of 16 bytes each, the compression engine 116 may attempt to compress each of the four segments within 4 bytes. Although it has been described that the segments of equal size are created, it may occur that the compression engine 115 may create different segments from the cache line 206 of different sizes.

In examples where it is identified by the compression engine 116 that a segment include all zero bytes, or a segment is a zero value segment, the compression engine 116 may compress the segment to its one fourth size and represent it with zeros of one fourth its original length. For non-zero segments, the compression engine 116 may either utilize a base delta immediate (BDI) compression technique, or a dictionary-free frequent value compression (FVC) technique.

In one example implementation of the present subject matter, the choice of either of the two compression techniques, e.g., the BDI or the FVC technique, may be based on a capability of the technique to compress the segment to at least its one fourth size. For example, if based on the BDI mechanism a segment may be compressed to at least its one fourth size, the compression engine 116 may terminate the compression. However, if it is determined by the compression engine 116 that based on the BDI technique, the segment cannot be compressed to at least one fourth of its original size, the compression engine 116 may utilize the FVC technique.

While utilizing the BDI technique of compression, the compression engine 116 may utilize the first segment of the cache line 206 as a base value and represent the remaining of the segments as an offset to the base value. On the other hand, while utilizing the FVC technique of compression, the compression engine 116 may encode a segment as a short special code, if its value is the same as its previous segment. For example, if the cache line 206 contains segments of 'AABBBC', the compression engine 116 may compress the segments as 'A, special code, B, special code, special code, C'.

Therefore, the compression engine 116 may compress cache line 206 of the page 202 based on the two-level compression mechanism and generate the compressed physical page 204. Generally, the size of the page 202 is about 4 Kilo Bytes (KB) that include 64 cache lines 206, each including 64 B of data. The compression engine 216 may compress the page 202 of 4 KB to any size that is a multiple of 1 KB, such as 1 KB, 2 KB, and 3 KB. In examples where a page is identified to be uncompressible by the compression engine 216, it may remain of the size 4 KB.

In one example implementation of the present subject matter, the processing engine 124 of the CE 102 may store the compressed physical page 204 onto the main memory 106. In said example implementation, the processing engine 124 may segregate the main memory 106 into two sections, a data section and a metadata section.

Figure 3:
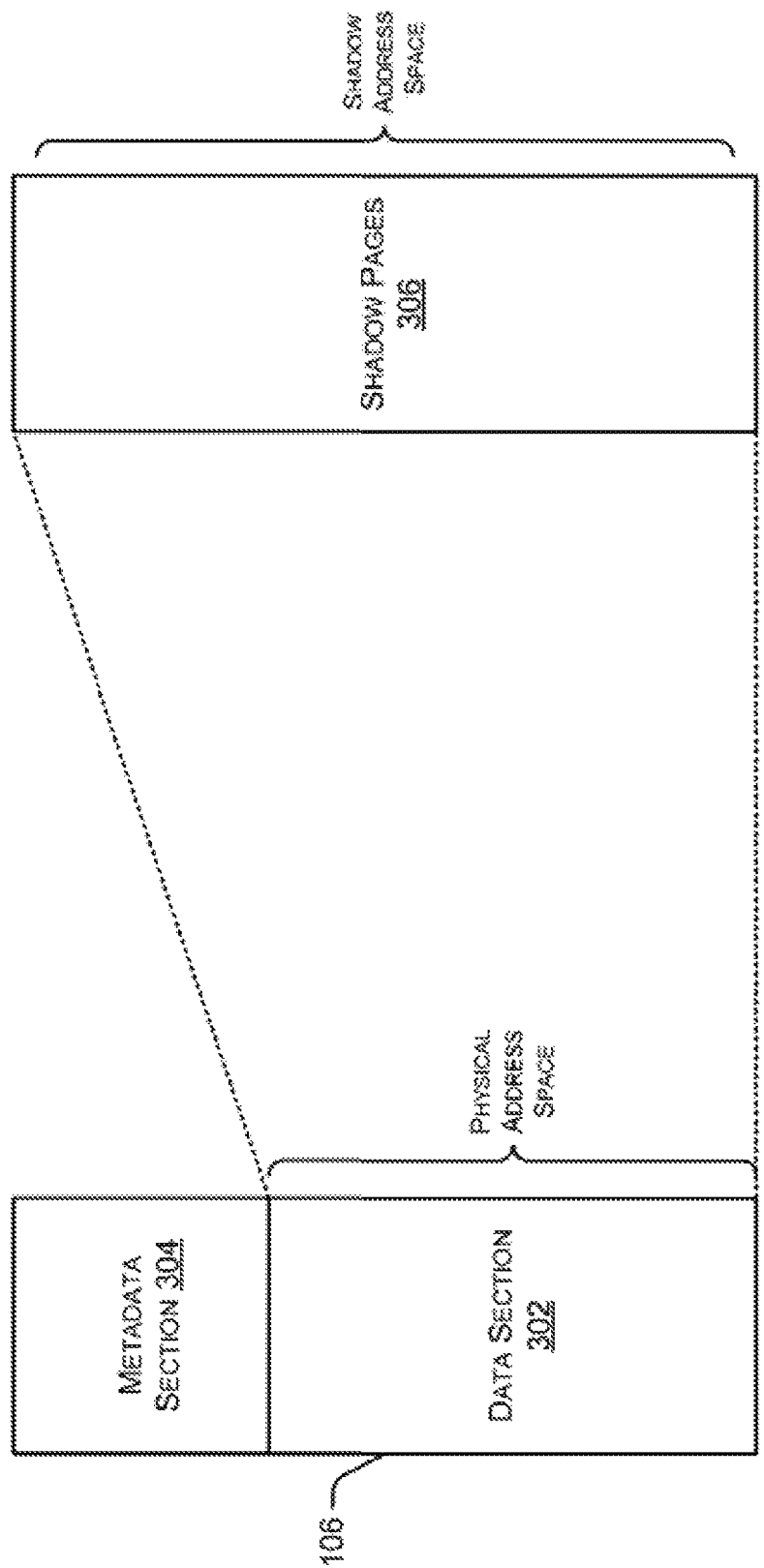
FIG. 3 illustrates an example main memory representation.

FIG. 3 depicts an example of the main memory 106 segregated into a data section 302 and a metadata section 304. The processing engine 124 may store the compressed physical page 204 in the data section 302 of the main memory 106. The metadata section 304 may contain compression information of each compressed physical page 204.

Further, the data section 302 of the main memory 106, which may also be noted as a part of the physical address space, may be projected as a shadow address space including shadow pages 306. In other words, the processing engine 124 of the CE 102 may map the shadow pages 306 to the compressed physical pages 204. In one example implementation, the mapping between the shadow pages 306 and the pages stored in the data section 302 may be based on me metadata section 304. In such example implementation, the metadata entries in the metadata section 304 may provide the mapping between each shadow address of the shadow address space and each of the compressed physical pages.

To store compressed physical pages onto the data section 302 of the main memory 106, the processing engine 124 may logically organize the data section 302 in chunks of fixed sizes, for example 16 MB each. A chunk may contain contiguous 1 KB data blocks in the data section 302 which may be allocated for storage of compressed physical pages 204. As described before, the compressed physical pages 204 may be of any size including 1 KB, 2 KB, 3 KB and 4 KB. In such examples, the CE 102 may have a predefined granularity size of 1 KB for the purpose of storage of the compressed physical pages 204 in the data section 302 of the main memory 106. Any compressed physical page 204 may therefore either be provided with 1, 2, 3, or 4 data blocks of 1 KB from the chunk based on the size of the compressed physical page 204 for storage in the data section 302. In other words, since the size of a compressed physical page is a multiple of 1 KB, the processing engine 124 may manipulate the compressed physical pages 204 at the granularity of 1 KB.

A compressed physical page 204, being stored for the first time may be stored in a default chunk of the data section 302. For the purpose of storage of the compressed physical pages 204 during the subsequent cycles of access and storage, the processing engine 124 may also maintain a list of free blocks in each chunk. The list may be implemented as a linked list where unused 1 KB data blocks in each chunk are linked together. Each free block may store a pointer that references to the next free block in the same chunk. The processing engine 124 may identify a free block based on the linked list. Since the free blocks are linked, the probability of a part of a page being stored at random different chunks of the data section 302 is reduced. Also, information of free blocks in a chunk is associated based on the linked list, the processing engine 124 may identify contiguous 1 KB blocks in a chunk, or in a neighboring chunk without maintaining global information of free space of the main memory 106.

The processing engine 124 may also maintain a collection of header pointers of the linked list of free blocks in each chunk such that the chunks are connected by the header pointers as a hierarchy. The processing engine 124 may store the header pointers in the metadata section 304 of the main memory 106. Since the free blocks are stored in a hierarchical structure, the processing engine 124 may identify a free 1 KB data block within the same chunk or a neighboring chunk without having to maintain a large set of global information of the main memory 106.

Figure 4:
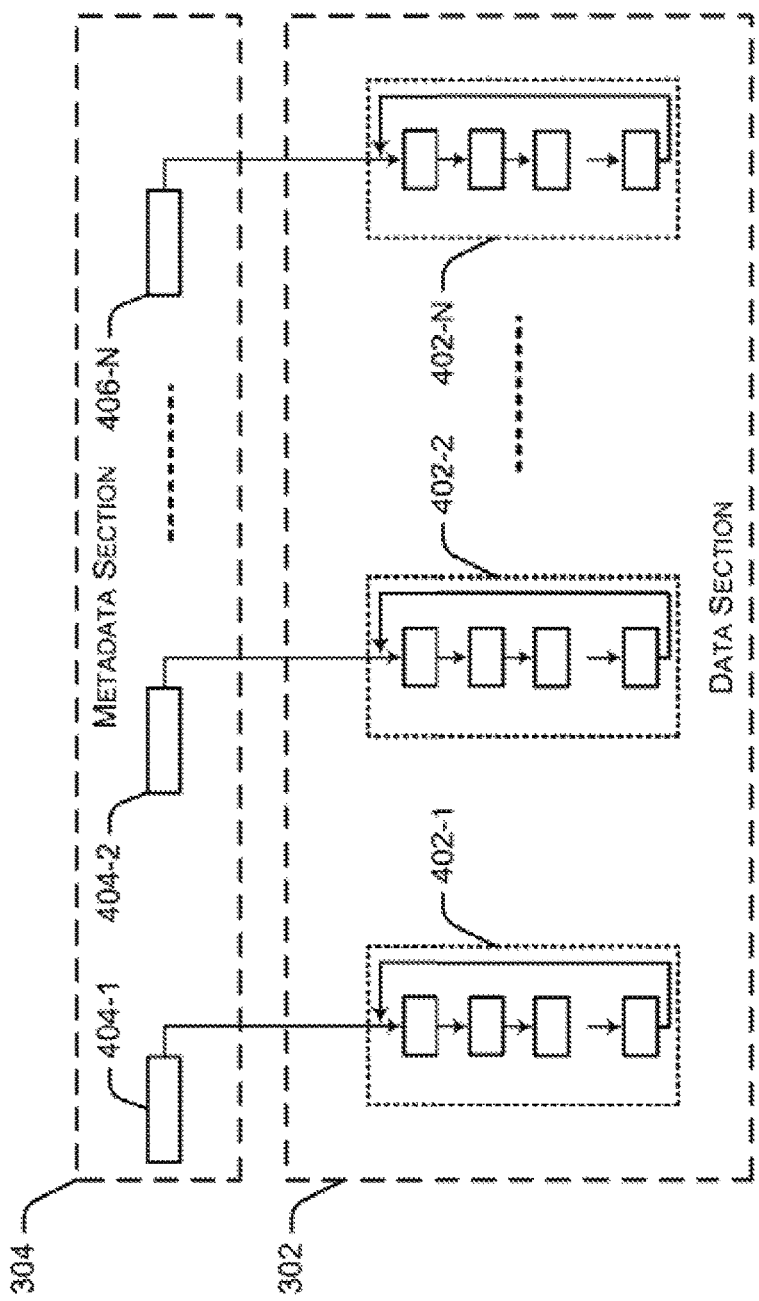
FIG. 4 illustrates an example data section and a metadata section representation of the main memory.

FIG. 4 depicts an example of the data section 302 and the metadata section 334 of the main memory 106 where the data section 302 is divided into chunks 402-1, 402-2, ..., 402-N. For the sake of explanation, the chucks 402-1, 402-2, ..., 402-N may be collectively referred to as chunks 302 and individually referred to as chunk 402, hereinafter. Each free block available in each chunk 302 has been depicted to link a next free block within the chunk 402. Further, header pointers 404-1, 404-2, ..., 404-N for each linked list of free blocks are stored in the metadata section 304. The header pointers 404-1, 404-2, ..., 404-N may be collectively referred to as header pointers 404 and individually referred to as header pointer 404, hereinafter.

In operation, the processing engine 124 of the CE 102 may determine the size of the compressed physical page 204 and identify free blocks in the data section 302 for storage. The processing engine 124 may identify the free blocks in the data section 302 based on the header pointers 404.

The compressed physical pages 204 stored in the data section 302 of the main memory 106 may have to be modified from time to time due to execution of applications by the OS of the computing device 100. Therefore, the compression ratio for the compressed physical page 204 may change during an application execution and a previously highly compressed physical page 204 may become bigger to have a lower compression ratio than before, or may even become uncompressible. Hence, to avoid any example of compression overflow where a previously compressed physical page 204, after an update, becomes a less compressible physical page and may no longer fit into the original allocated data block size, the processing engine 124 may allocate additional free blocks to an already stored compressed physical page 204.

For example, a condition of compression overflow may occur for a compressed physical page 204 when it was previously compressed to a size of 2 KB and later may be compressed as some size that is larger than 2 KB, say 3 KB. In such examples, the processing engine 124 may allocate a free block from the same chunk 402 based on the header pointers 404. In case the linked list of free blocks is empty for the same chunk 402, the processing engine 124 may identify a free block from other neighbouring chunks 402.

Referring to FIG. 3 again, the main memory 106 includes the metadata section 304 where metadata entries are stored corresponding to the compressed physical pages 204 stored in the data section 302. Each metadata entry may contain information associated with the compressed physical page 204 in other words, the metadata section 304 includes compression information of each compressed physical page 204, such as the compression technique used and a set of pointers to 1 KB physical blocks of a compressed physical page. The information related to the compression technique and set of pointers may be included in a set of metadata parameters.

In one example implementation of the present subject matter, the metadata parameters may include, but not be limited to, a status of compression, a plurality of pointers to the compressed physical page 204, and page information associated with the compressed physical page 204. In said example implementation, the metadata entries in the metadata section 304 may be directly mapped to physical addresses and may be managed by the CE 102 along with the OS of the computing device. In another example implementation of the present subject matter, the metadata entries may be managed by a basic input/output system (BIOS) of the computing device 100.

Figure 5:
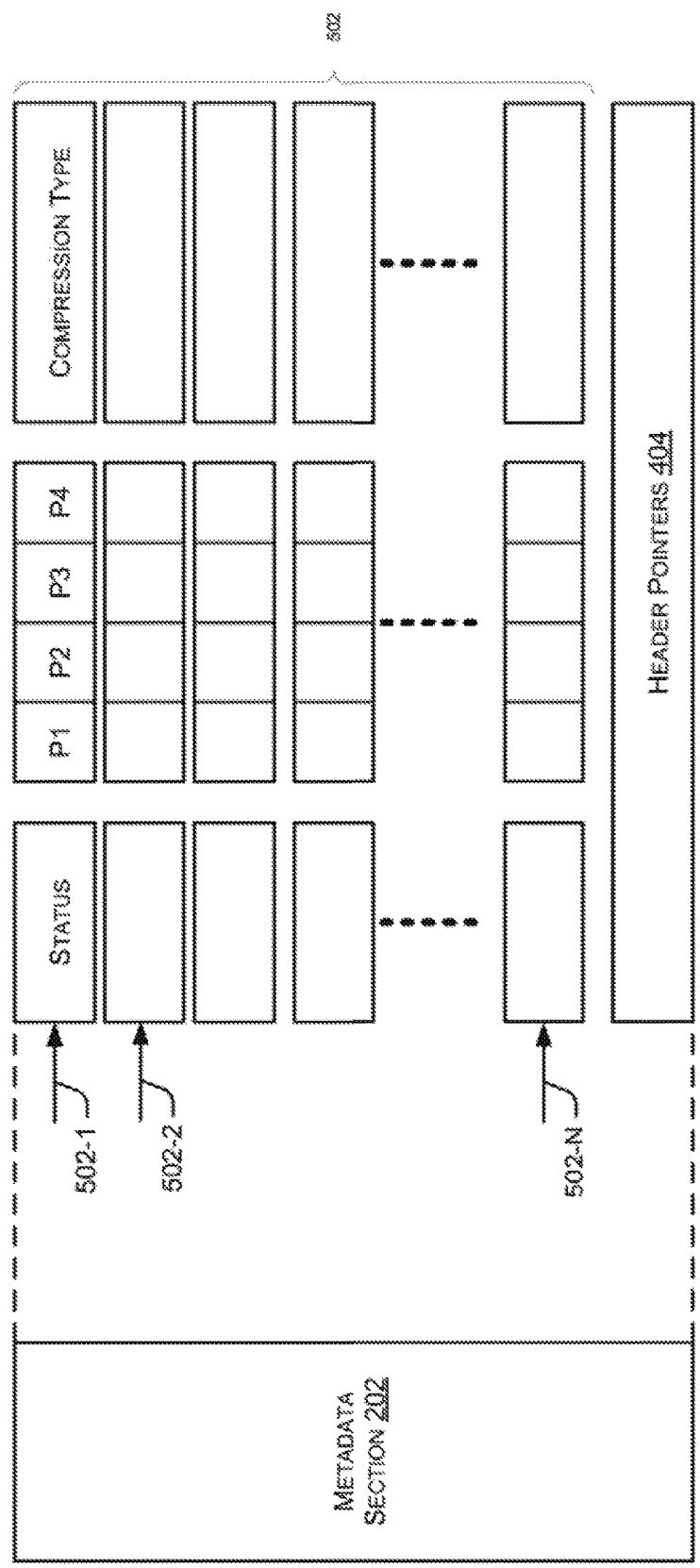
FIG. 5 illustrates an example metadata section of the main memory.

FIG. 5 depicts an example manner in which information is stored in the metadata section 304. The metadata section 304 may include different metadata entries 502-1, 502-2, . . . , 502-N. The metadata entries 502-1, 502-2, . . . , 502-N may be commonly referred to as metadata entries 502 and individually referred to as metadata entry 502. Further, a fixed number of metadata entries 502 may be stored in the metadata section 304 to store the metadata of shadow pages 306. Since each metadata entry 502 is corresponding to a single shadow page 306, the total number of metadata entries 502 stored in the metadata section 304 may be determined by the capacity of the shadow address space.

Each metadata entry 502 may include information corresponding to status, a plurality of pointers, and a compression type. In an example implementation, each metadata entry 502 contains a status region, a pointer region consisting of four pointers corresponding to the compressed physical page 204, and a page information region including compression type used for compression of the compressed physical page 204.

The status region may contain information corresponding to a number of valid pointers stored in the pointer region. Each pointer in the pointer region may include a reference to a data block of 1 KB in the data section 302. That is, for a page of 4 KB stored in the data section 302, all the four pointers may point to a 1 KB region each in the data section 302. As described earlier, a predefined granularity of 1 KB may be defined by the CE 102. Therefore, for a compressed physical page 204 of 3 KB, a corresponding metadata entry 502 may include 3 valid pointers. Consequently, the status region may include a value 3. Similarly, if the status region includes a value of 2, it may be noted that the compressed physical page 204 is of size 2 KB and merely two pointers from amongst the four are valid pointers. Therefore, the value of the status region may range between zero to four where a value less than four may imply that the compressed physical page 204 is compressed. In such an example, all the pointers in each metadata entry 502 may not be valid as a compressed page may be of size less than 4 data blocks.

Although it has been described that four pointers may be utilized for the purpose of referencing compressed physical pages 204 of 4 KB, in examples where the size of a page is bigger, more pointers may be utilized in each metadata entry 502. Similarly, in examples where the size of a page is smaller, fewer pointers may be utilized in each metadata entry 502.

The information corresponding to the compression type may indicate the type of compression technique utilized from amongst the two-level compression mechanism for each cache line 206. In one example implementation, a zero value in the compression type may indicate that the cache line 206 is uncompressed, and a non-zero value may represent a particular compression utilized for the cache line 206. Therefore, the metadata section 304 may maintain two levels of metadata in each metadata entry 502, firstly the metadata of a whole compressed physical page and, secondly the metadata of each cache line 206 in the page.

As described earlier, the metadata section 304 of the main memory 106 may also include header pointers 404. The header pointers 404 may include pointers to a linked list of free blocks of different chunks in the data section 302 of the main memory 106.

Hence, the CE 102 may store data in the main memory 106 based on the above described methods. In one example implementation, the CE 102 may also de-allocate data from the main memory 106. The processing engine 124 may de-allocate the compressed physical page 204 based on a two-step mechanism. First, the processing engine 124 may return the blocks occupied by the compressed physical pages 204 in the data section 302 to the linked list of free blocks. Further, the processing engine 124 may also release a corresponding metadata entry 502 in the metadata section 304 of the main memory 106. It may occur that till the time of de-allocation of the compressed physical page 204 from the data section 302, the data within the page may have changed and correspondingly may have to be written to storage devices associated with the computing device 100.

To write data to the storage devices, the decompression engine 118 of the CE 102 may either decompress the compressed physical page 204 to generate a corresponding page 202 and provide it to the storage device or may provide the compressed physical page to the storage device to save bandwidth during the transfer. In examples when the decompression engine 118 provides the compressed physical page 204 to the storage device, the compressed physical page 204 may be decompressed after transfer and prior to storage on the storage device.

In one example implementation of the present subject matter, the CE 102, apart from utilizing the compression and decompression of physical pages and storage of the pages in the main memory 106, may also cache metadata entries 502 from the metadata section 304. The CE 102 may cache the metadata entries 502 in the metadata cache 120 based on a two level metadata caching mechanism. The two level metadata caching mechanism may allow the CE 102 to avoid two or more memory accesses to access data stored in the data section 302.

The two level metadata caching mechanism may include caching the metadata entries 502 from the metadata section 304 along with caching of pointers referencing to uncompressed cache line 206 in a compressed physical page 204. The caching of the metadata entries 502 may allow the CE 102 to directly identify location and details related to a compressed physical page 204 without accessing the metadata section 304 for the purpose of access.

As described earlier, while compressing the cache lines 206 based on the predefined two-level compression mechanism, the compression engine 116 may encounter some uncompressible cache lines 206. In such examples, the compression engine 116 may leave the cache lines 205 uncompressed and store them in the uncompressed region 210 of the compressed physical page 204. Further, a pointer may also be stored in the compressed region 208 to refer to the location where the uncompressible cache line is stored. Therefore, to avoid multiple accesses to obtain uncompressed cache lines 206 from the data section 302, caching of the pointers referencing to the uncompressed cache line 206 may also be done in the two level metadata caching mechanism.

Hence, based on the implementation of the two level metadata caching mechanism, accessing the compressed physical page 204 may merely include one memory access.

In one example implementation of the present subject matter, the CE 102 may also implement a predicting and pre-fetching mechanism based on which next pages to be accessed by the workloads may be predicted. Therefore, in the first level of metadata cache, the metadata entries 502 may be pre-fetched and, in the second level of the metadata cache, pointers to uncompressed cache lines may be pre-fetched. Based on the prediction, the CE 102 may cache the metadata entries and associated pointers for storage in the metadata cache 120. Also, the CE 102 may implement an over pre-fetching mechanism that may pre-fetch one more block in the compressed region 208 of a shadow page if a next block to be fetched is identified to be a pointer referenced to an uncompressed cache line 206. The over pre-fetching mechanism may thus allow the CE 102 to reduce access to the uncompressed cache line 206 by first accessing the pointer and then the cache line 206 itself.

In another example implementation, the CE 102 may also implement a scheduling mechanism based on a predefined priority. For example, the scheduling mechanism may prioritize data access for which metadata entries have been cached by the CE 102 over any other data access.

Figure 6:
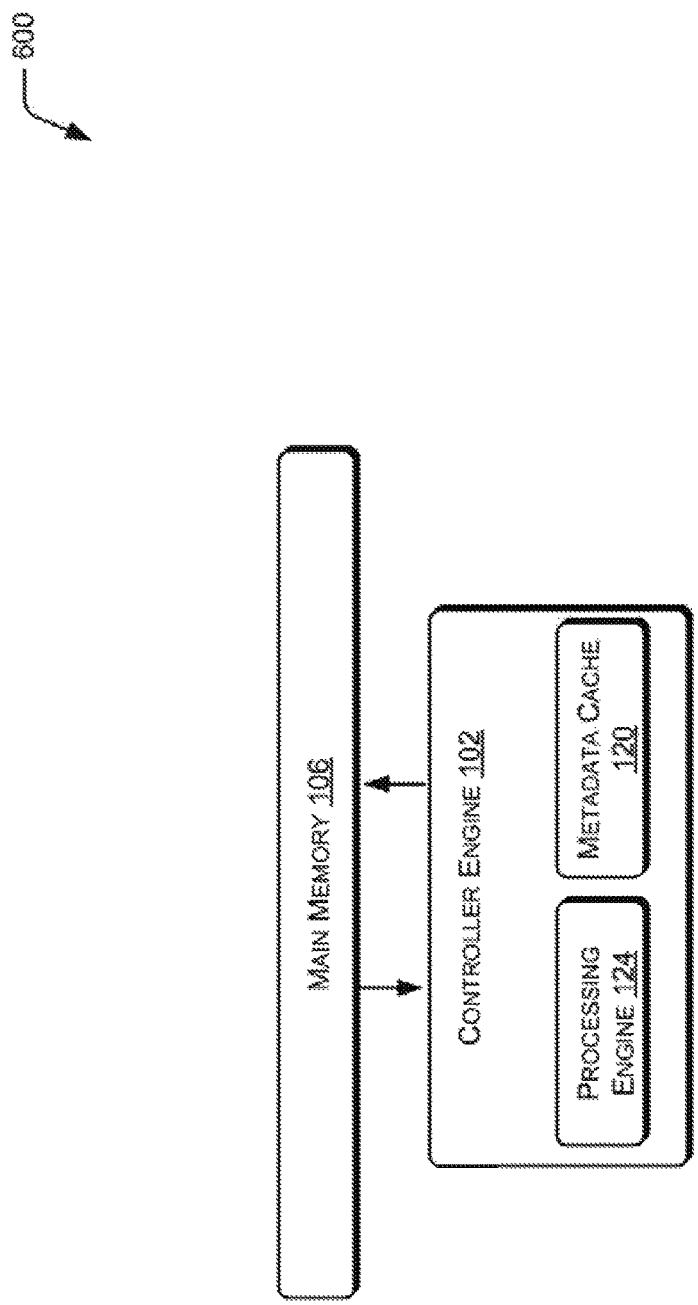
FIG. 6 illustrates another example computing device, implementing a controller engine.

FIG. 6 illustrates another example of computing device 600 implementing the CE 102. The CE 102 may communicate with the main memory 106. In one example, the CE 102 may include the processing engine 124 and the metadata cache 120. The processing engine 124 may receive a request to read data from a main memory 106, where the request may include a shadow address corresponding to location of storage of the data. As described earlier, the data may be stored in the compressed region of data section 302 of the main memory 106. The stored data may reside in the form of compressed physical page 204, compressed based on the predefined two-level compression mechanism and comprising a compressed region 208 and an uncompressed region.

The processing engine 124 may identify a metadata entry 502 from a two level metadata cache 120 based on the shadow address, where the metadata entry may include information corresponding to one or more metadata parameters associated with the compressed physical page 204. The processing engine 124 may further determine a physical address corresponding to the shadow address based on the identified metadata entry 502, wherein the physical address corresponds to a location of storage of the compressed physical page 204 in the main memory 106.

Figure 7:
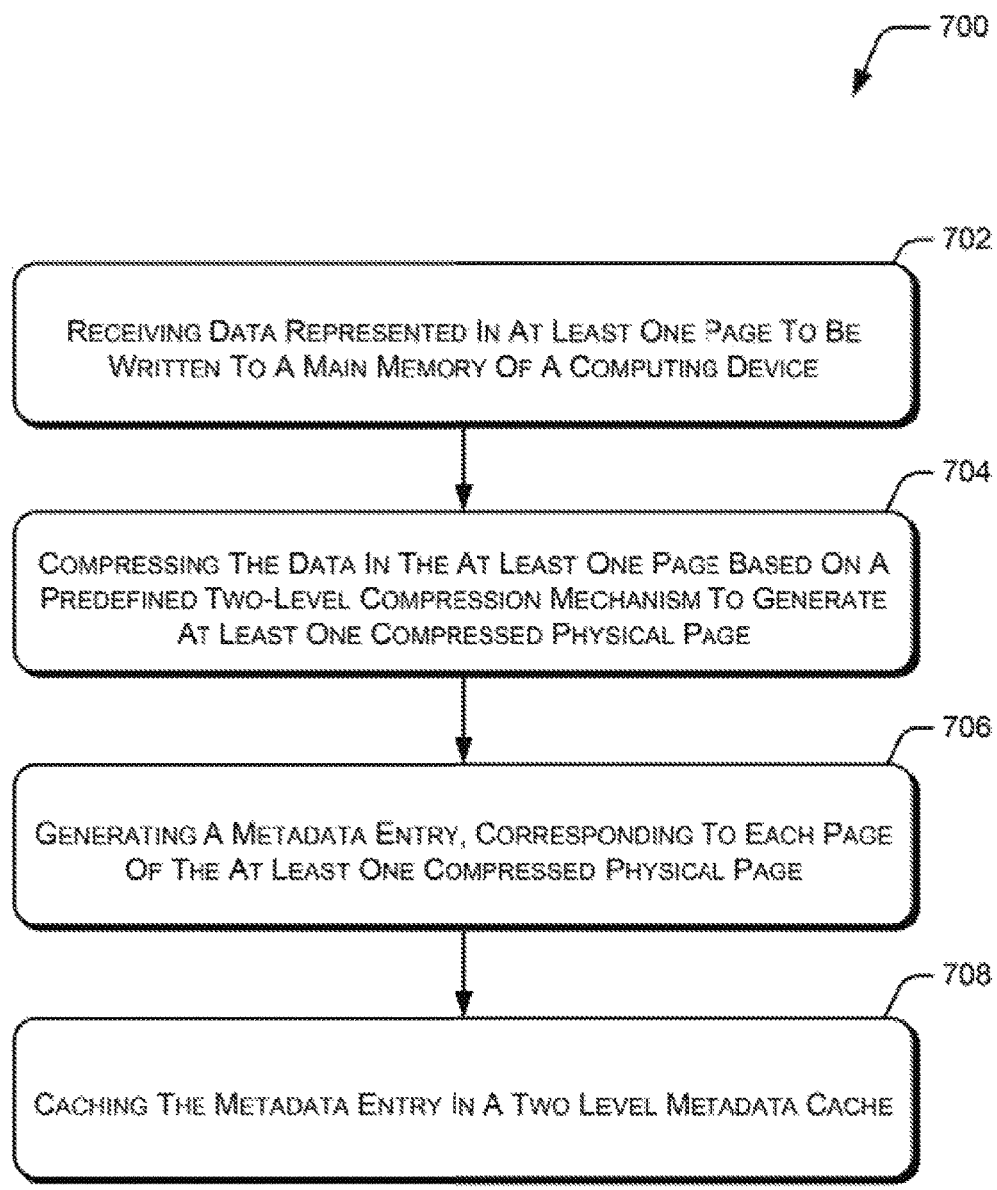
FIG. 7 illustrates an example method of dynamic memory expansion.

FIG. 7 illustrates a method 700 for dynamic memory expansion, according to an example implementation of the present subject matter. The order in which the method 700 is described is not intended to be construed as a limitation, and any number of the described method blocks may be combined in any order to implement the method 700, or an alternative method. Furthermore, the method 700 may be implemented by suitable hardware, non-transitory machine readable instructions, or a combination thereof.

It may be noted that steps of the method 700 may be performed by programmed components of computing devices. The steps of the method 700 may be executed based on instructions stored in a non-transitory computer readable medium, as will be readily noted. The non-transitory computer readable medium may include, for example, digital memories, magnetic storage media, such as a magnetic disks and magnetic tapes, hard drives, or optically readable digital data storage media.

Referring to FIG. 7, in an example implementation of the present subject matter, at block 702, data represented in at least one page to be written to a main memory of a computing device is received. In one example implementation, the main memory may store data in blocks represented as a plurality of physical pages. Further, each physical page from amongst the plurality of physical pages may comprise at least one cache line.

At block 704, the data in the at least one page is compressed based on a predefined two-level compression mechanism to generate at least one compressed physical page. The predefined two-level compression mechanism may include identifying a zero cache line within the at least one page, in the first level of compression. Further, in the second level of compression, cache lines may be segmented into segments and compressed to at least or around one fourth of original size. Based on the implementation of the two-level compression mechanism, each cache line within the at least one page is compressed to be stored in either a compressed region or an uncompressed region of the at least one compressed physical page. In one example implementation, the at least one compressed physical page may be stored in a data section of the main memory.

At block 706, a metadata entry, corresponding to each page of the at least one compressed physical page may be generated. The metadata entry may include information corresponding to one or more metadata parameters associated with each page of the at least one compressed physical page. In one example implementation of the present subject matter, the metadata entry may be stored in a metadata section of the main memory.

At block 708, the metadata entry is cached in a metadata cache. The metadata cache may include information included in the metadata entries. Further, the metadata cache may also include pointers referencing to the uncompressed region of the at least one compressed physical page where uncompressible cache lines are stored.

Figure 8:
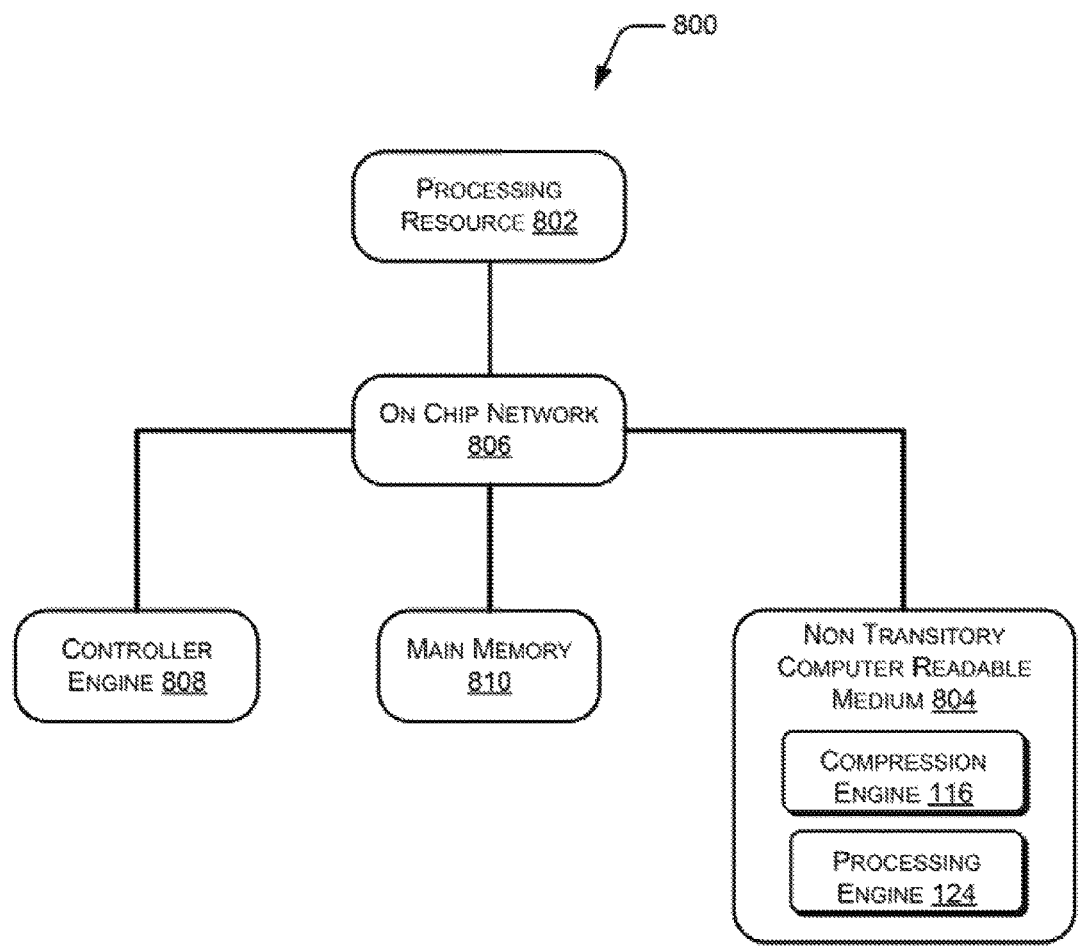
FIG. 8 illustrates an example computing environment implementing a non-transitory computer readable medium.

FIG. 8 illustrates a computing environment 800, according to an example implementation of the present subject matter. The computing device 800 may include a processing resource 802 communicatively coupled to a non-transitory computer readable medium 804 through an on chip network 806. The non-transitory computer readable medium 804 may be, for example, an internal memory device or an external memory device. In an example implementation, the on-chip network 806 may be a direct communication link, such as any memory read/write interface or may be a network-based communication link.

The processing resource 802 and the non-transitory computer readable medium 804 may also be communicatively coupled to a controller engine 808 and a main memory 810. The controller engine 808 may be implemented as a memory controller or as a memory-side controller communicatively coupled with the main memory 810.

In one example implementation of the present subject matter, the non-transitory computer readable medium 804 may include a set of computer readable instructions, such as the compression engine 116 and the processing engine 124. The set of computer readable instructions may be accessed by the processing resource 802 and the controller engine 808 through the on chip network 806 and subsequently executed to provide dynamic memory expansion.

The compression engine 116 may receive data represented in at least one page to be written to the main memory 810 of the computing device 800. In one example implementation, the main memory 810 may store data in blocks represented as a plurality of physical pages. Further, each physical page from amongst the plurality of physical pages may comprise at least one cache line. In an example implementation, the compression engine 116 may compress the data in the at least one page based on a predefined two-level compression mechanism to generate at least one compressed physical page.

The predefined two-level compression mechanism may include identifying of a zero cache line within the at least one page, in the first level of compression. Further, in the second level of compression, cache lines may be segmented into segments and compressed to at least or around one fourth of their original size. Based on the implementation of the two-level compression mechanism, each cache line within the at least one page is compressed to be stored in either a compressed region or an uncompressed region of the at least one compressed physical page. In one example implementation of the present subject matter, the at least one compressed physical page may be stored in a data section of the main memory 810.

The processing engine 124 of the non-transitory computer readable medium 804 may generate a metadata entry, corresponding to each page of the at least one compressed physical page. The metadata entry may include information corresponding to one or more metadata parameters associated with each page of the at least one compressed physical page. In one example implementation of the present subject matter, the metadata entry may be stored in a metadata section of the main memory 810. Further, the processing engine 124 may also cache the metadata entry in a metadata cache. The metadata cache may include information included in the metadata entries. Further, the metadata cache may also include pointers referencing to the uncompressed region of the at least one compressed physical page where uncompressible cache lines are stored. As described earlier, it may be noted that the metadata entries may be stored in the metadata section of the main memory 810 and the pointers are stored in the data section of the main memory 810.

Although implementations of dynamic memory expansion by data compression have been described in language specific to structural features and/or methods, it is to be noted that the present subject matter is not limited to the specific features or methods described. Rather, the specific features and methods are disclosed and explained in the context of a few implementations for memory expansion.

What is claimed is:

1. A method for dynamic memory expansion by data compression, the method comprising:
   receiving data represented in a page to be written to a main memory of a computing device, the page comprising a plurality of cache lines including compressible and uncompressible cache lines;
   compressing the page into a compressed physical page, including compressing each compressible cache line into a compressed cache line to be stored in a compressed region of the compressed physical page, each uncompressible cache line to be stored in an uncompressed region of the compressed physical page to which a corresponding pointer is stored in the compressed region;
   generating a metadata entry corresponding to the compressed physical page, the metadata entry including information corresponding to metadata parameters associated with the page that has been compressed into the compressed physical page; and
   caching, in a two level metadata cache, the metadata entry and, for each uncompressible cache line, the corresponding pointer to the uncompressed region of the compressed physical page at which the uncompressible cache line is stored.

2. The method as claimed in claim 1, where in the method further comprises segregating the main memory into a data section and a metadata section.

3. The method as claimed in claim 2, wherein the method further comprises storing the metadata entry onto the metadata section of the main memory.

4. The method as claimed in claim 2, wherein the method further comprises storing the compressed physical page onto the data section of the main memory.

5. The method as claimed in claim 2, wherein the method further comprises:
   identifying a free physical page in a chunk of the data section from among a plurality of chunks of the data section, based on a linked list of free blocks associated with the chunk, wherein the linked list is stored in the metadata section of the main memory, and wherein the data section is divided into the plurality of chunks linked in a hierarchy; and
   storing the one compressed physical page onto the physical page in the chunk of the data section of the main memory.

6. The method as claimed in claim 5, wherein the linked list of free blocks associated with the chunk is referenced by a header pointer from among a hierarchy of a plurality of header pointers.

7. The method as claimed in claim 1, wherein the metadata parameters include at least one of status, a plurality of pointers, and a compression type.

8. The method as claimed in claim 1, wherein the compressing further comprises, for each uncompressible cache line:
- identifying the uncompressible cache line of the page as uncompressible up to a slot of predefined size;
- storing the uncompressible cache line to the uncompressed region of the compressed physical page; and
- storing, within the uncompressed region of the compressed physical page, the pointer to the uncompressible cache line as stored in the uncompressed region.

9. The method as claimed in claim 8, wherein the compressing is based on a predefined two-level compression mechanism and further comprises, for each compressible cache line:
- identifying the compressible cache line of the page as compressible up to the slot of predefined size;
- compressing the compressible cache line into a compressed cache line based on the predefined two-level compression mechanism; and
- storing the compressed cache line within the compressed region of the compressed physical page.

10. The method as claimed in claim 1, wherein the method further comprises:
- receiving a request to read the data from the main memory, the request including a shadow address corresponding to a location of storage of the data;
- identifying the metadata entry from the two level metadata cache based on the shadow address;
- determining a physical address corresponding to a physical location of storage of the data in a data section of the main memory;
- accessing the compressed physical page from a data section of the main memory; and
- decompressing the compressed physical page to obtain the data.

11. The method as claimed in claim 1, wherein a size of the at least one compressed physical page is a multiple of a predefined granularity size.

12. A Controller Engine (CE) for dynamic memory expansion by data compression, the CE comprising:
- a processing engine to:
  - receive a request to read data from a main memory, wherein the request comprises a shadow address corresponding to a location of storage of the data, and wherein the data is stored as a compressed physical page having an uncompressed region storing uncompressible cache lines of the compressed physical page and a compressed region storing compressed cache lines of the compressed physical page and pointers to the uncompressible cache lines within the uncompressed region;
  - identify a metadata entry from a two level metadata cache based on the shadow address, the metadata entry including information corresponding to metadata parameters associated with the compressed physical page, and the pointers to the uncompressible cache lines within the uncompressed region;
  - determine a physical address corresponding to the shadow address based on the identified metadata entry, the physical address corresponds to a location of storage of the compressed physical page in the main memory;
  - access the compressed physical page from the main memory based on the physical address, including retrieving the uncompressible cache lines from the uncompressed region and the compressed cache lines from the compressed region;
  - decompress the compressed cache lines into decompressed cache lines; and
  - return, responsive to the request, the decompressed cache lines and the uncompressible cache lines.

13. The CE as claimed in claim 12, wherein the processing engine further implements one or more of:
- a predicting and pre-fetching mechanism to fetch the metadata entry to the metadata cache; and
- an over pre-fetching mechanism to cache the pointers to the uncompressible cache lines within the uncompressed region and the pointers to compressed cache lines within the compressed region, in the two level meta data cache.

14. The CE as claimed in claim 12, wherein the metadata entry is stored in a metadata section of the main memory and wherein the main memory is segregated into a data section and the metadata section.

15. The CE as claimed in claim 12, further comprising a page buffer to buffer pages for compression based on the predefined two-level compression mechanism.

16. The CE as claimed in claim 12, wherein the two level metadata cache caches the metadata entry and the pointers to the uncompressible cache lines in the uncompressed region.

17. The CE as claimed in claim 12, wherein the CE further comprises a processing engine to:
- de-allocate the compressed physical page from the main memory by freeing a block from a data section of the main memory to a linked list of free blocks; and
- release the metadata entry corresponding to the compressed physical page from a metadata section of the main memory.

18. The CE as claimed in claim 12, wherein the CE further comprises a compression engine to compress a page based on the predefined two-level compression mechanism and generate the compressed physical page.

19. A non-transitory computer-readable medium comprising instructions for dynamic memory expansion executable by a processing resource to:
- receive data represented in a page to be written to a main memory of a computing device, the page comprising a plurality of cache lines including compressible and uncompressible cache lines;
- compress the page into a compressed physical page, including compressing each compressible cache line into a compressed cache line to be stored in a compressed region of the compressed physical page, each uncompressible cache line to be stored in an uncompressed region of the compressed physical page to which a corresponding pointer is stored in the compressed region;
- generate a metadata entry corresponding to the compressed physical page, the metadata entry including information corresponding to metadata parameters associated with the page that has been compressed into the compressed physical page; and
- cache, in a two level metadata cache, the metadata entry and, for each uncompressible cache line, the corresponding pointer to the uncompressed region of the compressed physical page at which the uncompressible cache line is stored.

20. The method of claim 1, wherein the compression region comprises a plurality of slots corresponding to the plurality of cache lines,
- wherein for each compressible cache line, the slot corresponding to the compressible cache line stores the compressed cache line into which the compressible cache line has been compressed, and wherein for each uncompressible cache line, the slot corresponding to the uncompressible cache line stores the corresponding pointer to the uncompressed region in which the uncompressible cache line is stored.

* * * * *